(12) United States Patent
Sakaguchi et al.

(10) Patent No.: US 10,635,464 B2
(45) Date of Patent: Apr. 28, 2020

(54) INFORMATION PROCESSING DEVICE, SIMULATION METHOD, AND PROGRAM

(71) Applicant: OMRON Corporation, Kyoto-shi, Kyoto (JP)

(72) Inventors: Yasunori Sakaguchi, Takatsuki (JP); Fumiaki Narutani, Kusatsu (JP); Taku Oya, Kyoto (JP)

(73) Assignee: OMRON Corporation, Kyoto-shi (JP)

( * ) Notice: Subject to any disclaimer, the term of this patent is extended or adjusted under 35 U.S.C. 154(b) by 1012 days.

(21) Appl. No.: 14/384,406

(22) PCT Filed: Feb. 19, 2013

(86) PCT No.: PCT/JP2013/053961
§ 371 (c)(1),
(2) Date: Sep. 11, 2014

(87) PCT Pub. No.: WO2013/136918
PCT Pub. Date: Sep. 19, 2013

(65) Prior Publication Data
US 2015/0112460 A1  Apr. 23, 2015

(30) Foreign Application Priority Data

Mar. 15, 2012  (JP) .................................. 2012-058276

(51) Int. Cl.
*G06F 15/16* (2006.01)
*G06F 9/455* (2018.01)
(Continued)

(52) U.S. Cl.
CPC ............. *G06F 9/455* (2013.01); *G05B 17/02* (2013.01); *G05B 19/056* (2013.01);
(Continued)

(58) Field of Classification Search
CPC ....................................................... G06F 9/455
See application file for complete search history.

(56) References Cited

U.S. PATENT DOCUMENTS 5,758,123 A   5/1998  Sano et al.
5,991,533 A  11/1999  Sano et al.
(Continued)

FOREIGN PATENT DOCUMENTS

JP   H08-054907 A    2/1996
JP   2010134839 A  *  6/2010
(Continued)

OTHER PUBLICATIONS

English translation of JP 2011-18107 A, pp. 2-24.*
(Continued)

*Primary Examiner* — Timothy A Mudrick
*Assistant Examiner* — Abdou K Seye
(74) *Attorney, Agent, or Firm* — Metrolex IP Law Group, PLLC (57) ABSTRACT

A PC, which is an information processing device, simulates a control program and displays the result of the simulation on a monitor. The PC acquires a value, and identification information identifying a variable for at least one variable at an arbitrary time during the simulation. The PC modifies the control program in accordance with an instruction from a user. The PC simulates the modified control program with the value of the variable identified by the acquired identification information as the value of the acquired variable. The PC displays the result of simulating the modified control program on the monitor.

6 Claims, 10 Drawing Sheets

(51) Int. Cl.
G05B 17/02 (2006.01)
G05B 19/05 (2006.01)

(52) U.S. Cl.
CPC ........... *G05B 2219/13152* (2013.01); *G05B 2219/13174* (2013.01); *G05B 2219/13179* (2013.01)

(56) References Cited

U.S. PATENT DOCUMENTS

| | | | |
|---|---|---|---|
| 8,397,220 B1* | 3/2013 | Philipp | G06F 9/461 717/135 |
| 2002/0022939 A1* | 2/2002 | Senta | G05B 19/0426 702/123 |
| 2004/0078182 A1* | 4/2004 | Nixon | G05B 17/02 703/22 |
| 2005/0234695 A1* | 10/2005 | Wang | G06F 17/5031 703/19 |
| 2009/0292514 A1* | 11/2009 | McKim | G09B 9/00 703/6 |

FOREIGN PATENT DOCUMENTS

| | | | |
|---|---|---|---|
| JP | 2011-18107 A * | 1/2011 | |
| JP | 2011-192016 A | 9/2011 | |
| WO | 2012028161 A1 | 3/2012 | |

OTHER PUBLICATIONS

Saito Akira et al. "Simulation Method, System and Program", JP2010134839—Translation (Year: 2010).*
The ISR dated Apr. 16, 2013.

* cited by examiner

```
[Common]
Project0.
1.00
YYYYMMDD hh:mm:ss

[Global]
_gData,LINT,0

[Program()]
Program0.aaa,BOOL,0
Program0.bbb,INT,1234
          ⋮
          ⋮
          ⋮
          ⋮
```

Select the variable(s) to use for the restore.  — 9071
907

| | Variable name | Variable type | Variable value |
|---|---|---|---|
| ☑ | Var_A | ..... | ..... |
| ☑ | Var_B | ..... | ..... |
| ☐ | Var_C | ..... | ..... |
| ☐ | Var_D | ..... | ..... |
| ☑ | Var_E | ..... | ..... |
| ☐ | Var_F | ..... | ..... |

INFORMATION PROCESSING DEVICE, SIMULATION METHOD, AND PROGRAM

FIELD

The present invention relates generally to an information processing device, a simulation method, and a program, and more specifically relates to an information processing device capable of executing a simulation for a control program, a simulation method in an information processing device, and a program for controlling an information processing device.

BACKGROUND

Conventionally, there is known a controller support device capable of simulating a control program executed for each control cycle within a controller that controls the operation of a machine, and that contains a sequence control module and a motion control module.

For instance, Japanese Unexamined Patent Application Publication Number 2011-192016 (Patent Document 1) discloses a controller support device which, when simulating a control program that includes motion control, is capable of re-executing the simulation from a control cycle between the start and the end of execution. More specifically, the controller support device simulates one cycle of the sequence control subprogram in the control program and generates the execution results for the sequence control subprogram. The controller support device simulates one cycle of the motion control subprogram and generates the execution results for the motion control subprogram. Subsequently, the controller support device increments and updates the control cycle number. The controller support device determines whether or not the control cycle is restartable, and if the controller support device determines the control cycle is restartable, the controller support device saves the contents of a restart data buffer updated during the previous control cycle to a restart data storage device.

REFERENCES

Patent Documents

Patent Document 1: Japanese Unexamined Patent Publication No. 2011-192016

SUMMARY

Technical Problem

However, the controller support device in Patent Document 1 is not capable of using the variables input and/or the variables output during simulation of the control program to re-execute a simulation of the control program. Therefore, if a simulation is being re-executed with an altered control program, the user needs to re-enter the variables.

With the above mentioned problems in mind, the present invention provides an information processing device, a simulation method and a program for supporting a controller, capable of facilitating the setting of the input variables used for a simulation.

Solution to Problem

One aspect of the present invention is an information processing device for simulating a control program executed in a controller that controls operations of a machine. The information processing device includes a simulation execution module for simulating the control program stored in the storage module; a display control module for causing a display device to display the results of the simulation; an acquisition module for acquiring a value for at least one variable and acquiring identification information identifying said variable at an arbitrary time during the simulation; and a modification module for modifying the control program stored in the storage module. The simulation execution module executes the modified control program while using the value of the variable identified by the acquired identification information as the value of the acquired variable. The display control module causes the display device to the display the result of simulating the modified control program.

The acquisition module may acquire the values of a plurality of variables at an arbitrary time in association with a plurality of identification information that identifies each variable. Further, on the basis of a designation of at least one variable from among the plurality of variables, the simulation execution module may execute the modified control program while using the value of the designated variable as the value of the acquired variable that is associated with the identification information of the designated variable.

The plurality of variables may include modifiable variables input to the simulation and non-modifiable variables output due to execution of the simulation. Of the modifiable variables and the non-modifiable variables, the simulation execution module may use only the modifiable variables to simulate the modified control program.

The arbitrary time may be at the start or immediately after the start of simulating the control program.

The information processing device may further include a reception module and an extraction module. The identification information for the variable may be the name of the variable. The display control device may cause the display device to display a list of the names of the acquired variables. The reception module accepts the designation of one or more variables from among the plurality of variables displayed in the list, and the extraction module extracts the value of the variable for each designated variable from among the values of the plurality of variables. The simulation execution module simulates the modified control program using the value of the extracted variable.

Another aspect of the present invention is a simulation method executed on an information processing device for simulating a control program executed in a controller that controls operations of a machine for each control cycle. The simulation method includes the steps of simulating the control program; displaying the result of the simulation; acquiring a value for at least one variable and acquiring identification information identifying said variable at an arbitrary time during the simulation; modifying the control program; simulating the modified control program with the value of the variable identified by the acquired identification information as the value of the acquired variable; and displaying the result of simulating the modified control program.

Another aspect of the present invention is a program controlling an information processing device that simulates a control program executed in a controller controlling operations of a machine for each control cycle. The program includes the steps of simulating the control program; displaying the result of the simulation; acquiring a value for at least one variable and acquiring identification information identifying said variable at an arbitrary time during the simulation; modifying the control program; simulating the modified control program with the value of the variable identified by the acquired identification information as the value of the acquired variable; and displaying the result of simulating the modified control program, with the above steps executed on a processor in the information processing device.

EFFECTS

The above-mentioned invention facilitates the setting of the input variables used in a simulation.

DETAILED DESCRIPTION

Embodiments of a control system according to the present invention are described below with reference to the drawings. In the following description, the same components are given the same reference numerals. The names and functions of those components are the same. Therefore, an explanation therefore is not repeated.

A. System Configuration

Figure 1:
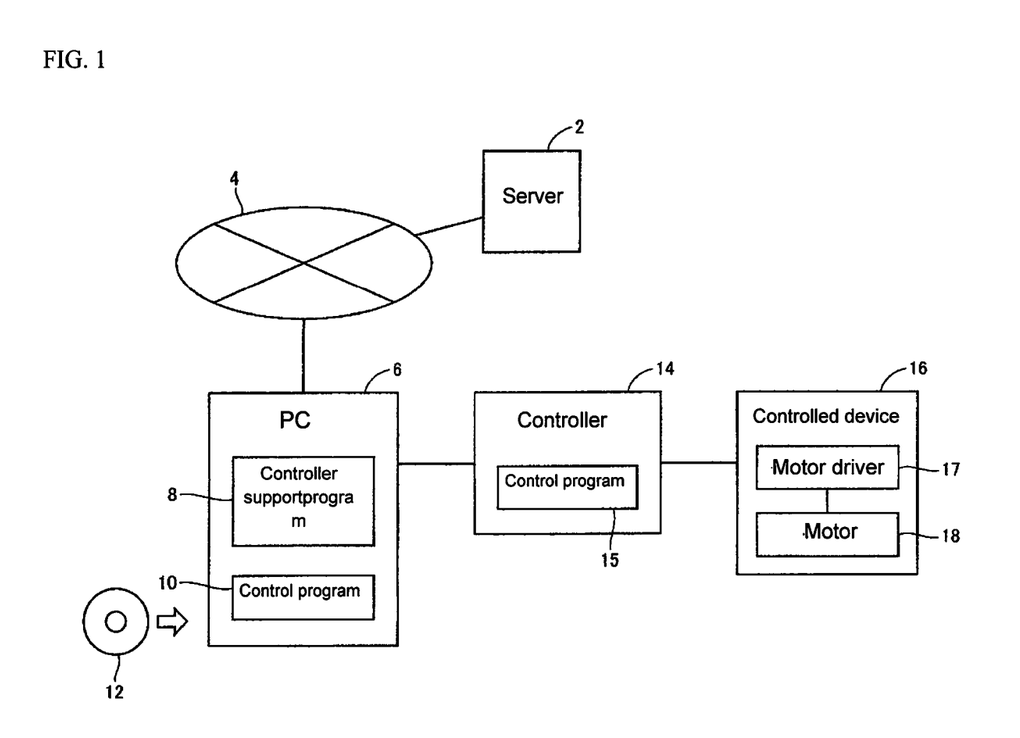
FIG. 1 is an explanatory diagram of a configuration of the control system.

FIG. 1 is an explanatory diagram of a configuration of the control system. Referring to FIG. 1, a control system 1 according to an embodiment of the present invention is constituted by a server 2, a network 4, a personal computer (PC) 6, a controller 14, and a controlled device 16.

The server 2 is connected to the PC 6 via the network 4. The PC 6 is connected to the controller 14, enabling the PC 6 to communicate with the controller 14 controlling the controlled device 16.

The PC 6, which is an information processing device, functions as a controller support device. A controller support program 8 and a control program 10 created by the user are stored in the PC 6. A Compact Disc-Read Only Memory (CD-ROM) 12 stores the controller support program 8. The controller support program 8 installed on the PC 6 may be installed from the CD-ROM 12.

The controller 14 controls the operations of the controlled device 16. In this embodiment of the present invention, a Programmable Logic Controller (PLC) is employed as one example of the controller 14. That is, the PLC is provided with what is known as a motion control function. The controller 14 stores a control program 15 which defines the control details for a controlled device 16. The controller 14 executes a single loop of the control program 15 for each control cycle. The control program 15 stored in the controller 14 is a copy of the control program 10 stored in and sent from the PC 6.

The controlled device 16 includes a motor 18 such as a servo motor, or a stepping motor, and a motor driver 17 for driving the motor.

The motor driver 17 supplies the motor 18 with a drive current. For each control cycle, the controller 14 executing the control program 15 supplies the motor driver 17 with a position command value, and the motor driver 17 supplies the motor 18 with a drive current in accordance with the position command value. If the motor 18 is a servo motor, the motor 18 is provided with an encoder, and the encoder detects the actual rotation position of the motor 18. The motor driver 17 uses the actual rotation position of the motor for feedback control.

The foregoing description explains a case where a controller support program is installed on the PC 6 via a CD-ROM 12; however the present embodiment is not limited to this case, and for example the controller support program may be downloaded to the PC 6 from the server 2 via the network 4. The control program may be treated in the same manner.

B. Outline of the Process

Figure 2:
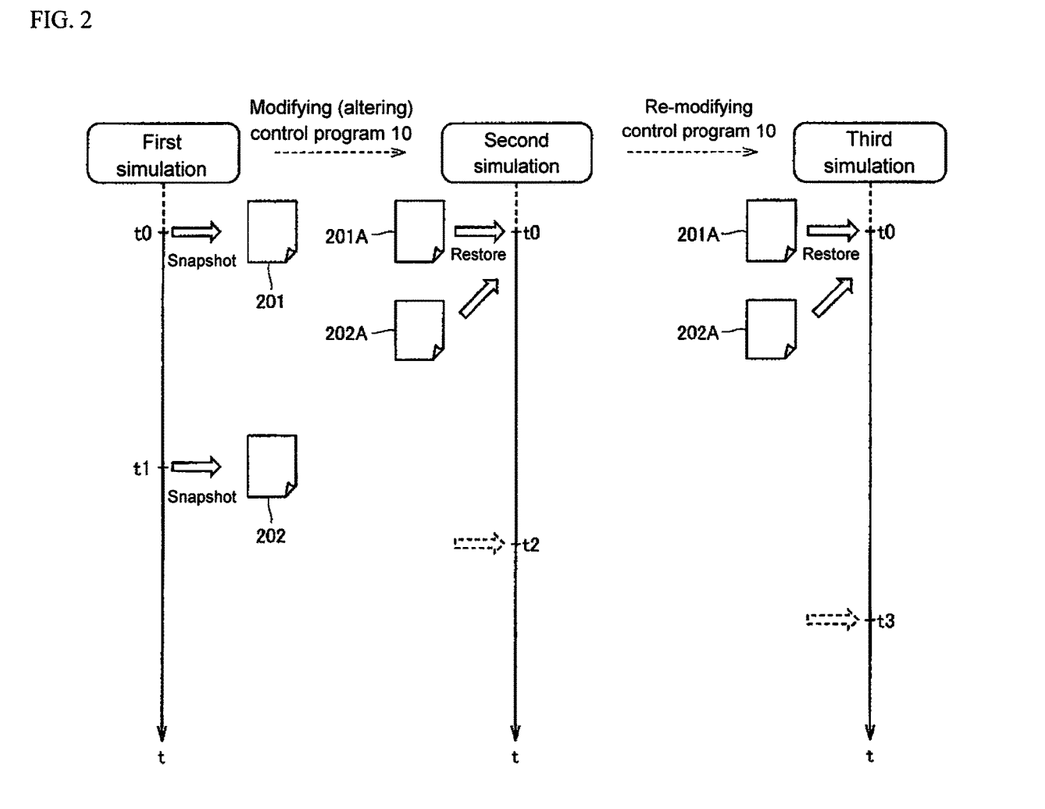
FIG. 2 is an explanatory diagram of a simulation executed a PC.

FIG. 2 is an explanatory diagram of a simulation executed the PC 6. Referring to FIG. 2, based on instructions from a user, the PC 6 uses a control program 10 which is prepared in advance to execute the first simulation. At this time, the PC 6 takes a snapshot when the user instructs the PC 6 to take a snapshot at the start (t=t0) of the simulation of the program.

A "snapshot" is a process of acquiring the status of memory at a given time and of saving that data separately. More specifically, a "snapshot" is the process of acquiring the status of the variables in the memory at a given time, and saving the acquired status of the variables to a file. In the present embodiment, the description is given assuming that the PC 6 uses a snapshot to acquire the value of a variable, the identification information for identifying said variable, and the type of said variable at an arbitrary time during a simulation. Moreover, when the PC 6 acquires a plurality of variables, the PC 6 acquires the value of the plurality of variables in association with the plurality of identification information that identifies each variable and the type of the variables. Finally, the CSV format may be used as the file format.

The above-mentioned variables may include modifiable (writable) variables used when inputting a simulation and non-modifiable (non-writable) variables outputted from an executed simulation. As an example, the identification information may be, a variable title (hereafter, variable name). As an example, a variable may be of type bool, int, or string.

In the following explanation, the input variables are described as one example of a modifiable variable, and the output variables are described as one example of a non-modifiable variable. Additionally, for the convenience of explanation, information including the variable name, the variable value, and the variable type will be abbreviated and referred to as "variable information". That is, the "variable information" includes the variable name, the variable value, and the variable type. A snapshot acquires the variable information for one or more variables.

b1. Example 1

When the PC 6 takes a snapshot, the PC 6 saves the acquired variable information (variable name, variable value, variable type) to a file. At this point, it is assumed for the sake of convenience that the snapshot is taken a time t=t0, that the variable information for six variables is acquired, and that the acquired variable information is saved into a file 201. More specifically, the snapshot saves the following to the file 201: "variable name, value, type"="Var_A, True, Bool", "Var_B, False, Bool", "Var_C, 1000, int", "Var_D, True, Bool", "Var_E, 2000, int", "Var_F, 3000,int".

At this point, the user verifies each variable in the file 201. If the user determines there is an issue with the value for the variables, the user modifies (revises) the control program 10, and executes a second simulation.

In this case, the user executes a restore process. Using the variable values acquired by a snapshot as the variable values in a simulation (returning the variable values) is called a "restore". More specifically, a "restore" is a process where the user selects an input variable required to execute a simulation from among the variables in the file 201 and overwrites the value of an input variable in memory with the value of the selected input variable. The PC 6 re-executes the simulation using the overwritten variable value. For example, the PC 6 re-executes the simulation with the values of Var_A, Var_B, and Var_E from the above-mentioned six variable values being True, False, and 2000 respectively.

For example, the user may edit the file 201 to create a file 201 A including the values of the selected input variable, cause a CPU 901 (refer to FIG. 3) to read the file 201A, and thereby execute the abovementioned restore.

If a satisfactory result is not acquired from even the second simulation, the user may again modify the control program 10. The PC 6 may execute a third simulation using the file 201 A used during the second simulation. The number of simulations is not limited to three.

As above described, a user may use the variables acquired with a snapshot as input variables (input conditions), and execute a simulation on the PC 6 each time the control program 10 is modified. Hereby, there is no need for the user to enter input variables each time the control program 10 is modified.

b2. Example 2

Here it is assumed that, in accordance with a user instruction, the PC 6 takes a snapshot at a time t1, which is after the time t=t0. The variable information acquired in this case is stored in a file 202.

As with Example 1, in this case the user also selects an input variable required to execute the simulation from among the variables in the file 202, and stores the selected input variable (variable name, variable value, variable type) in a separate file 202A from the file 202.

Next, the user modifies the control program and thereafter executes a second simulation using the file 202A. If a satisfactory result is not acquired from even the second simulation, a third simulation may be executed upon modifying the control program.

b3. Additional Examples

The user may temporarily halt (suspend) a simulation, and restart the simulation using the file 201A or the file 202A. For example, on executing a second simulation after modifying the control program, the user may temporarily halt the simulation at a time t2, and restart the simulation using the file 201A or the file 202A. Additionally, on executing a third simulation after further modifying the control program, the user may temporarily halt the simulation at a time t3 and restart the simulation using the file 201A or the file 202A.

b4. Overview

As above described, the timing for taking a snapshot, or executing a restore is not particularly limited. The above described Example 1 in particular exemplifies a preferred usage. Additionally, as another example of the preferred usage, if the operation of the control target is halted during the simulation, a snapshot can be taken of the variables at the time of the halt, and a restore executed either when the simulation starts (time, t=0) or right after the simulation starts with some of the variables acquired from the snapshot.

In any case, taking a snapshot facilitates the user in setting the input variables after the control program is modified. That is, because the user can use the PC 6 to carryout the restore process using some of the variables acquired with a snapshot (or all the variables, depending on the situation), even if the control program is modified many times, the user is still able to easily execute multiple simulations.

Furthermore, a plurality of snapshots may be taken during the first simulation; the number of snapshots is not limited to one. If a plurality of snapshots is taken, then the variable (some, or all the variables depending on the situation) acquired during any of the plurality of snapshots may be used.

C. The PC 6

Figure 3:
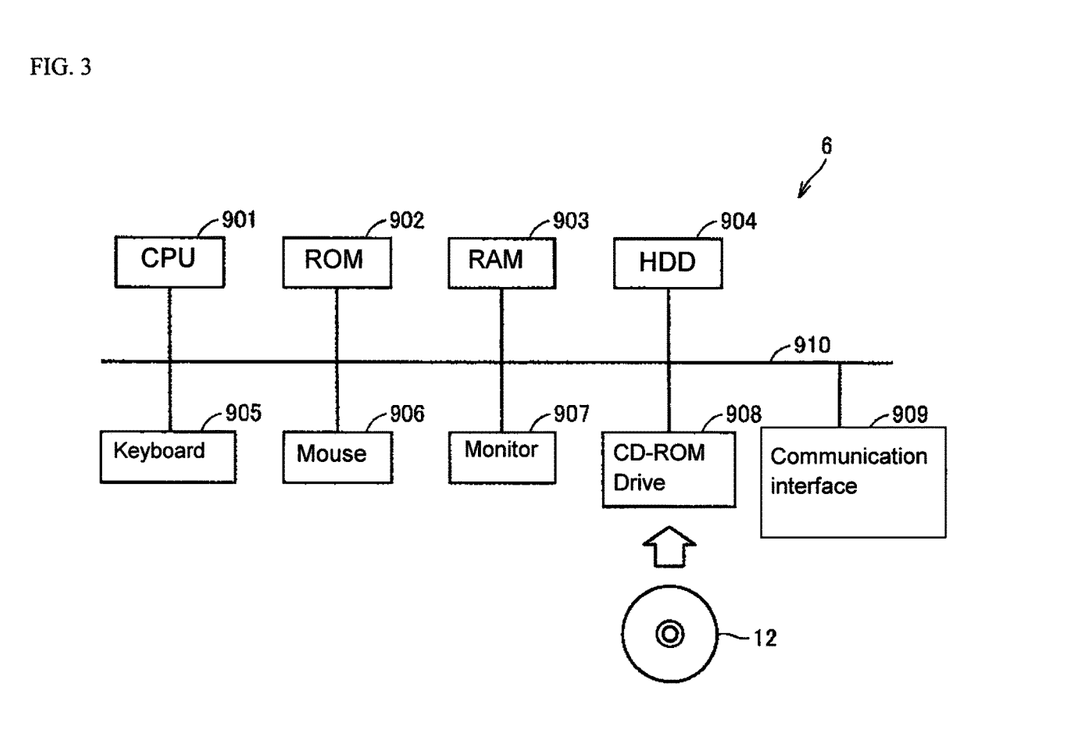
FIG. 3 is an explanatory diagram of a hardware configuration for the PC.

FIG. 3 is an explanatory diagram of a hardware configuration for the PC 6. Referring to FIG. 3, a PC 6 according to an embodiment of the present invention includes a CPU 901, a ROM 902, a RAM 903, and an HDD 904, a CD-ROM drive 908, a communication interface 909, a monitor 907, a keyboard 905, and a mouse 906. Each of these components is mutually connected via an internal bus 910.

The HDD 904 is typically a non-volatile magnetic memory, and stores the controller support program read from the CD-ROM 12 via the CD-ROM drive 908. The control program 15 is also stored on the HDD 904.

The CPU 901 extracts a controller support program 8 according to the present embodiment that is stored in the HDD 904 to the RAM 903 and the like and executes the program.

The RAM 903 is a volatile memory used as the working memory. The ROM 902 generally stores programs such as an operating system (OS), and the like.

The communication interface 909 typically supports generic communication protocols such as those for an Ethernet (TM) and a Universal Serial Bus (USB); the communication interface 909 enables data communication with the server 2 via the network 4, and enables data communication with the controller 14.

The monitor 907 may be constituted by a liquid crystal display device, a cathode ray tube (CRT), a plasma display device, and the like. The monitor 907 displays the processing results from the PC 6. The keyboard 905 receives input keyed in by the user, and the mouse 906 receives pointing operations from the user.

Figure 4:
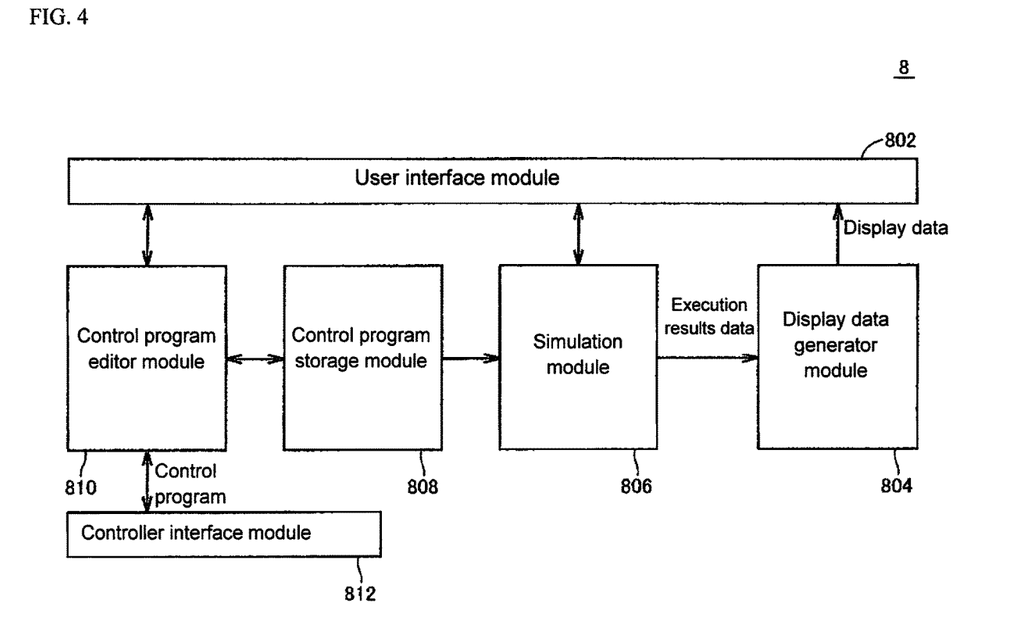
FIG. 4 is an explanatory diagram of function blocks implemented through a CPU executing a controller support program.

FIG. 4 is an explanatory diagram of the function blocks implemented through the CPU 901 executing the controller support program 8. FIG. 4 shows a user interface module 802, a display data generator module 804, a simulation module 806, a control program storage module 808, a control program editor module 810, and a controller interface module 812.

The user interface module 802 creates the contents of a window displayed on the monitor 907 connected to the PC 6, and receives instructions from the user via the keyboard 905 and the mouse 906.

The control program editor module 810 allows the user to input and edit the control program. The control program editor module 810 also compiles the control program if the control program needs to be compiled before being executed. The generated control program is sent to the controller 14 via the controller interface module 812. Additionally the generated control program is stored in the control program storage module 808 which is a prescribed region of the HDD 904. The control program editor module 810 can also read and edit the control program 15 stored on the controller 14 via the controller interface module 812. The control program editor module 810 may, for example, receive an instruction from the user to modify (for instance, alter) the control program, and proceeds to modify the control program on the basis of the instruction.

The simulation module 806 serves as a simulator for the controller 14. The simulation module 806 simulates the operations of the controller 14 executing the control program 15 in accordance with the control program 10 stored in the control program storage module 808, and calculates the command values for positions that should be output by the controller 14 for each control cycle.

The simulation module 806 may also simulate the conditions resulting from the arrival of external signals that affect the operation of the control program, or simulate the conditions resulting from changes in the internal state of the controller 14 such as the contents of the memory for the controller 14 due to executing of the control program 15 itself and those changes affecting the operation of the control program 15.

The simulation module 806 may also receive instructions from the user via the user interface module 802 for executing the simulation. In other words, the user interface module 802 may also accept user instructions meant for the simulation module 806.

The display data generator module 804 generates display data that represents chronological changes in the results data created by the simulation module 806. The display data generator module 804 sends the generated display data to the user interface module 802 so that the display data may be presented on the monitor 907 connected to the PC 6 in a graphical or a textual form.

D. The Control Structure

The control structure in the PC 6 is described next.

d1. Snapshot Process Flow

Figure 5:
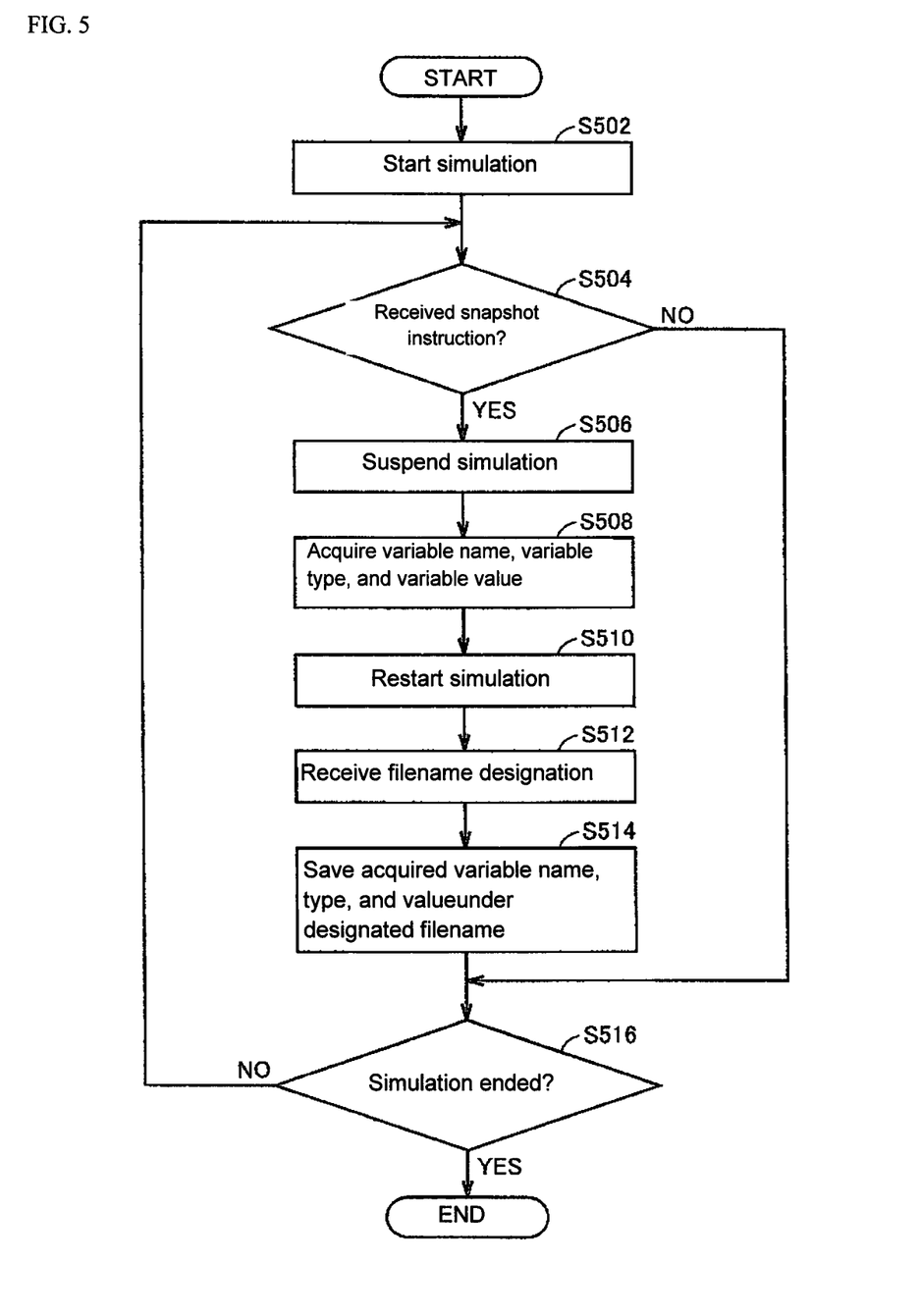
FIG. 5 is an explanatory flow chart illustrating the flow of processes when the PC takes a snapshot.

FIG. 5 is an explanatory flow chart illustrating the flow of processes when the PC 6 takes a snapshot. Referring to FIG. 5, the CPU 901 of the PC 6 starts a simulation of the control program 10 on the basis of a simulation start instruction from the user in step S502. The CPU 901 determines whether or not a snapshot instruction was received.

If the determination in step S504 is affirmative (if YES), the CPU 901 temporarily halts the simulation in step S506. If the determination in step S504 is negative (if NO), the CPU 901 continues to step S516.

In step S508, the CPU 901 acquires the variable name, the variable type, and the variable value. That is, the CPU 901 acquires the variable information at the time a snapshot instruction is input. In step S510, the CPU 901 restarts the simulation. The CPU 901 may use the input of an instruction from the user to restart the simulation as a trigger for restarting the simulation.

In step S512, the CPU receives the designation of a filename under which to save the variable information acquired from the snapshot. In step S514, the CPU 901 saves the variable information (the variable name, the variable type, and the variable value) under the designated filename.

In step S516, the CPU 901 determines whether or not the simulation ended. If the determination in step S516 is affirmative (if YES), the CPU 901 terminates the processing sequence. If the determination in step S516 is negative (if NO), the CPU 901 continues to step S504.

d2. Restore Process Flow

Figure 6:
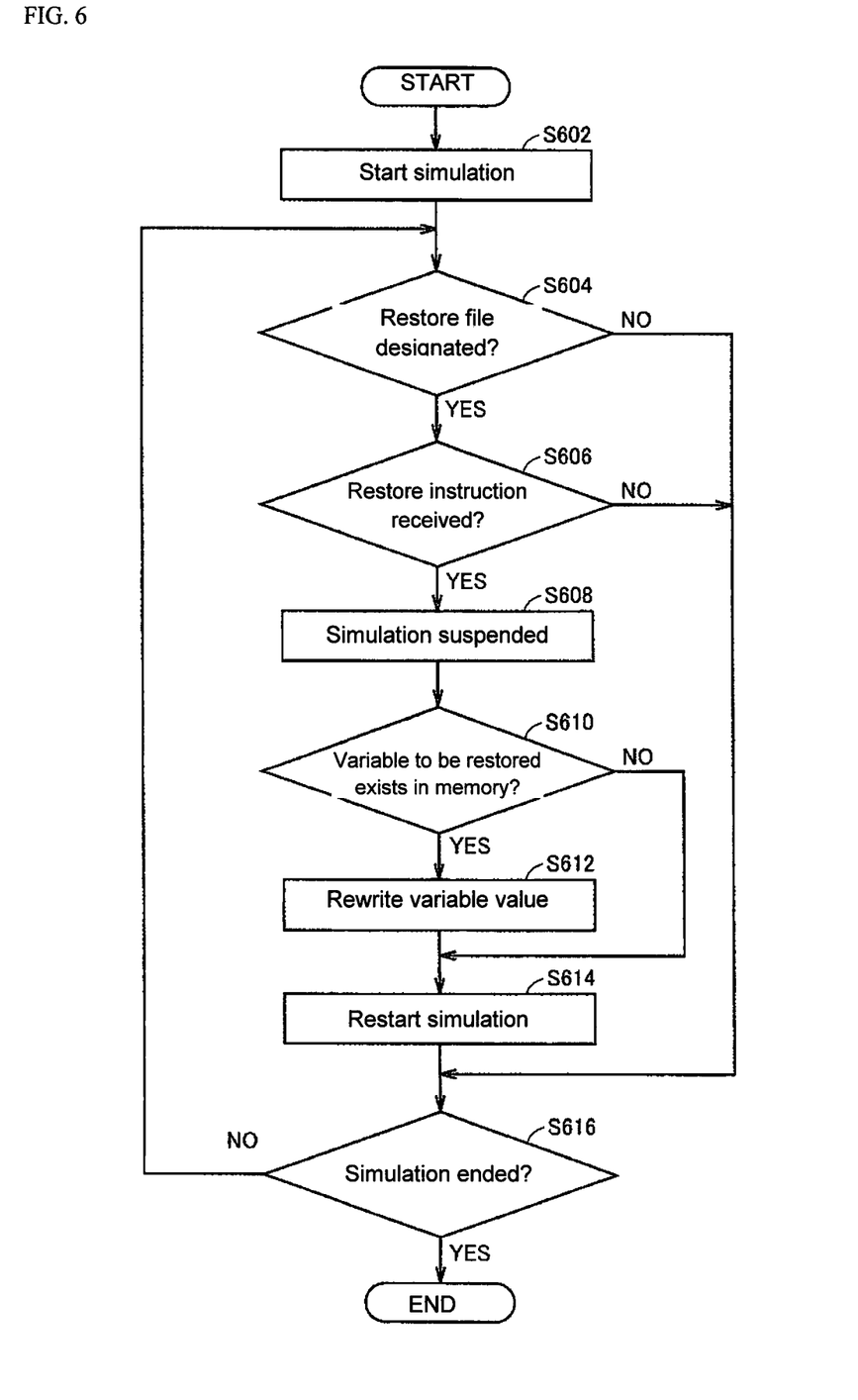
FIG. 6 is an explanatory flow chart illustrating the flow of processes when the PC executes a restore.

FIG. 6 is an explanatory flow chart illustrating the flow of processes when the PC 6 executes a restore. Referring to FIG. 6, the CPU 901 of the PC 6 starts a simulation of the control program 10 on the basis of a simulation start instruction from the user in step S602. In step S604, the CPU 901 determines whether or not a file was designated for use in the restore.

If the determination in step S604 is affirmative (if YES), the CPU 901 determines in step S606 whether or not an instruction for the restore was received from the user. If the determination in step S604 is negative (if NO), the CPU 901 continues to step S616.

If the determination in step S606 is affirmative (if YES), the CPU 901 temporarily halts the simulation in step S608. If the determination in step S606 is negative (if NO), the CPU 901 continues to step S616.

In step S610, the CPU 901 determines whether or not the variables to be restored are present in memory (RAM 903). That is, the CPU 901 determines whether or not a variable having the same variable name as a variable name written to the file appears as a variable when the simulation is temporarily halted. If the determination in step S610 is affirmative (if YES), the CPU 901 rewrites the variable value in step S612. If the determination in step S610 is negative (if NO), the CPU 901 continues to step S614.

For instance, assume the following is stored in a file 201A after a snapshot is taken: "Var_A, True, Bool", "Var_B, False, Bool", "Var_E, 2000, int". In this case, if "Var_E" is the only variable that appears when the simulation is temporary halted in step S608, then only the value of the variable "Var_E" is rewritten in step S612.

In step S614, the CPU 901 restarts the simulation. In step S616, the CPU 901 determines whether or not the simulation ended. If the determination in step S616 is affirmative (if YES), the CPU 901 terminates the processing sequence. If the determination in step S616 is negative (if NO), the CPU 901 continues to step S604.

d3. Sequence for Taking a Snapshot

Figure 7:
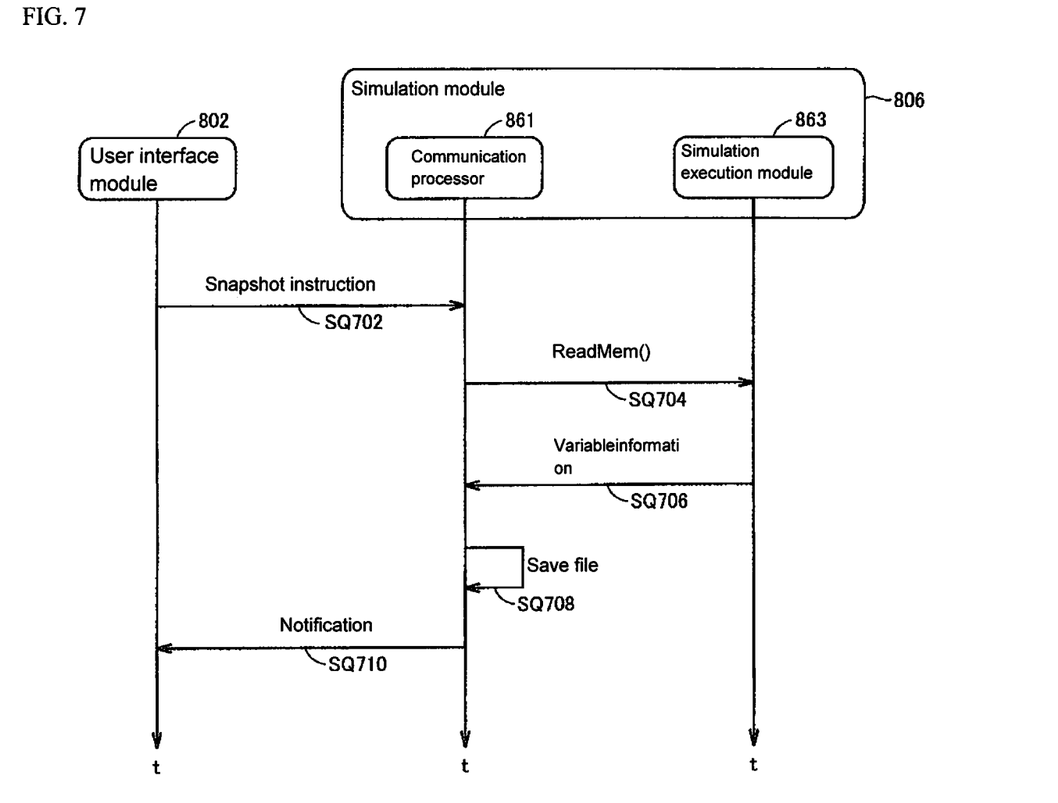
FIG. 7 is a sequence chart representing when the PC takes a snapshot.

FIG. 7 is a sequence chart representing when the PC 6 takes a snapshot. Referring to FIG. 7, during sequence SQ702, the user interface module 802 sends an instruction for taking a snapshot to the communication processor 861 in the simulation module 806.

The communication processor 861 sends a read instruction (readMem( )) that reads the variable information to the simulation execution module 863 during sequence SQ704. During sequence SQ706 the simulation execution module 863 notifies the communication processor 861 of the variable information.

During sequence SQ708, the communication processor 861 saves the acquired variable information to a file with the designated filename. During sequence SQ710, the communication processor 861 issues a notification to the user interface module 802 indicating that the variable information was saved. On receiving the notification, the user interface module 802 displays the particulars on the monitor 907 indicating that the variable information was saved.

d4. Sequence for Executing a Restore

Figure 8:
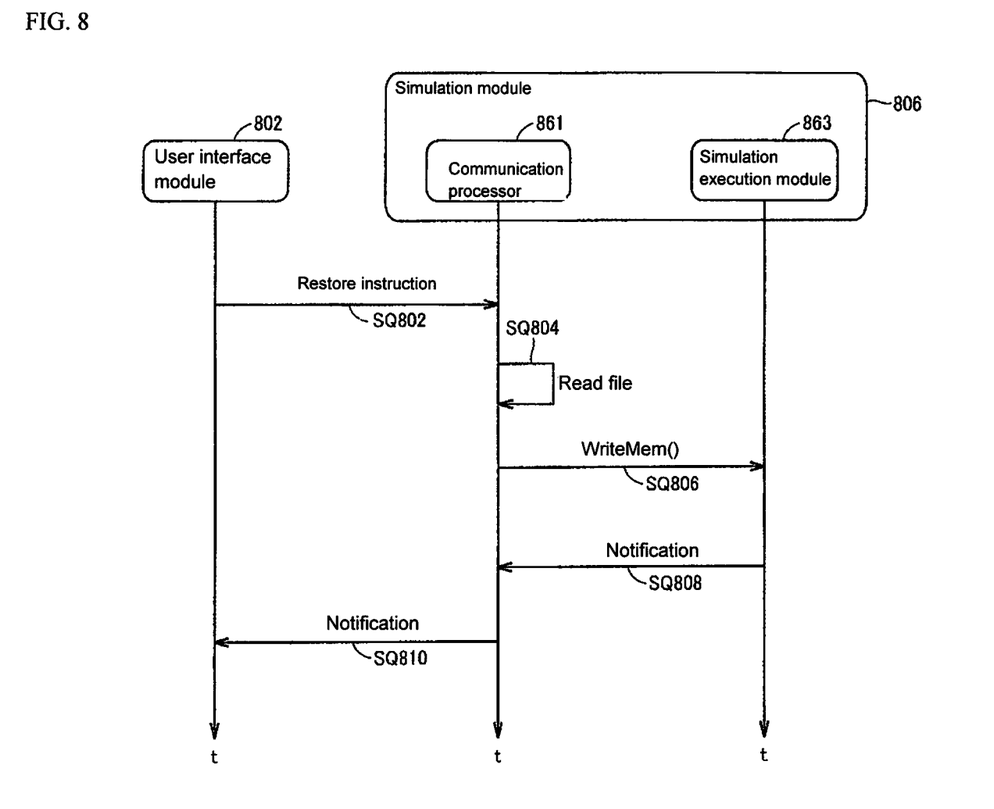
FIG. 8 is a sequence chart representing when the PC executes a restore.

FIG. 8 is a sequence chart representing when the PC 6 executes a restore. Referring to FIG. 8, during sequence SQ802, the user interface module 802 sends an instruction for executing a restore to the communication processor 861 in the simulation module 806. The communication processor 861 reads the file during sequence SQ804. That is, the communication processor 861 reads the variable information that is saved in the memory as a file.

The communication processor 861 sends a write instruction (WriteMem( )) that writes the variable information to the simulation execution module 863 during sequence SQ806. The simulation execution module 863 notifies the communication processor 861 that a write was executed, or that the variable to be written does not exist (error).

During sequence SQ810, the communication processor 861 passes on the particulars of the notification received to the user interface module 802. On receiving the notification, the user interface module 802 displays the particulars on the monitor 907 indicating, for example, that the restore completed or that the restore failed.

E. Structure of the Data

Figure 9:
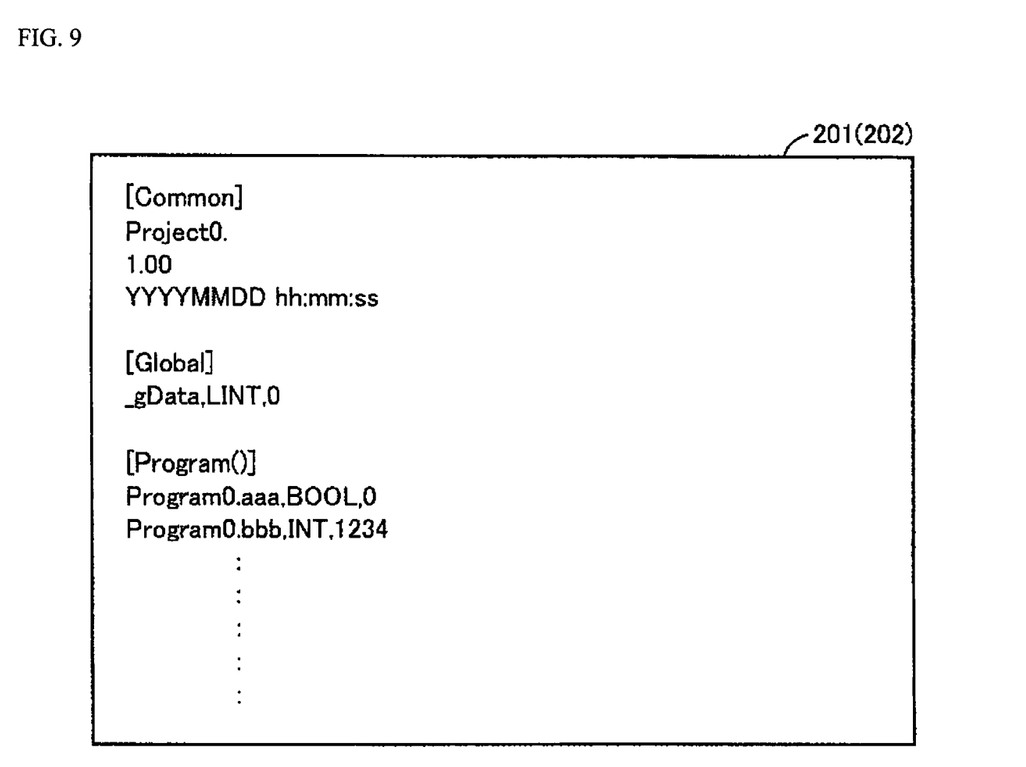
FIG. 9 illustrates variable information obtained from a snapshot.

FIG. 9 illustrates the variable information obtained from a snapshot. More specifically, FIG. 9 illustrates the internals (the variable information) of the file 201 (or the file 202).

Referring to FIG. 9, the file 201 includes shared information, and variable information. The shared information is presented under the "[Common]" column. The variable information may include, for example, global variables ([global]), and program variables ([program ( )]).

In this case, using the PC 6 the user may create the file 201A which is used for the restore using some of the global variables and/or some of the program variables (or all the variables, depending on the situation). Moreover, in the example illustrated in FIG. 9 the input variables and the output variables are not shown separately.

F. The User Interface

Figure 10:
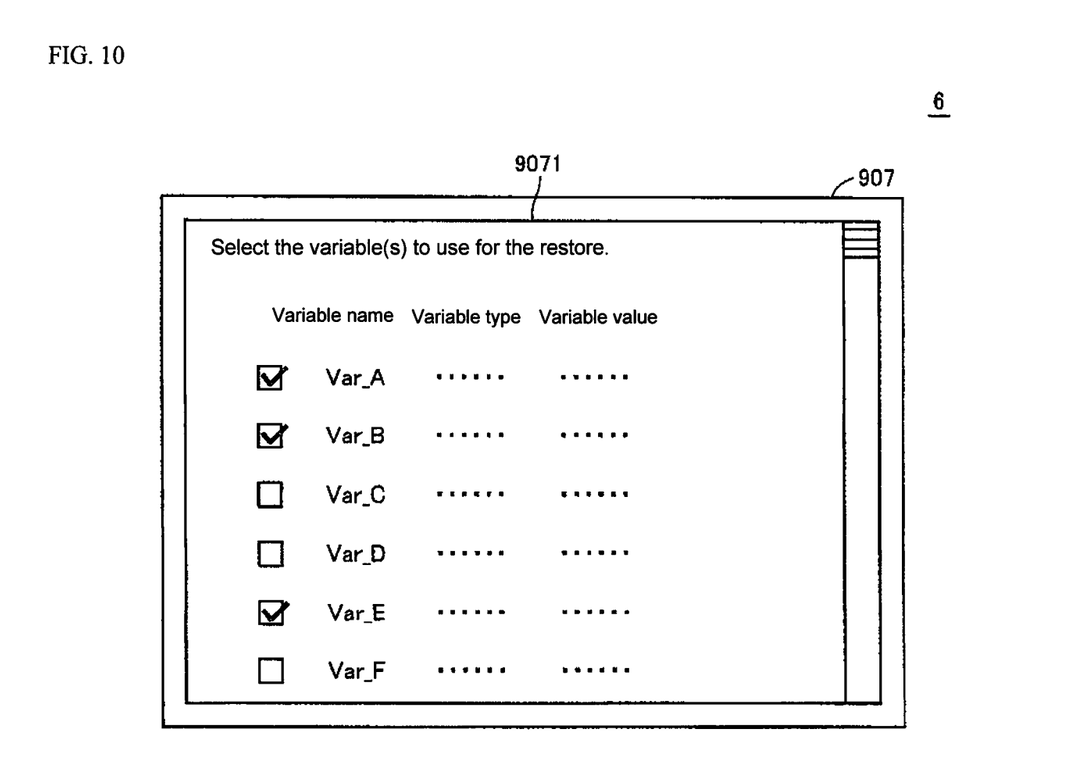
FIG. 10 illustrates one example of the user interface employed in generating the data used for a restore.

FIG. 10 illustrates one example of the user interface employed in generating the data used for a restore. That is, FIG. 10 illustrates the data from the file 201A, 202A, and the like.

Referring to FIG. 10, the user interface module 802 displays a list of a plurality of variable information (variable names, variable types, and variable values) acquired from a snapshot on the monitor 907. More specifically, the user interface module 802 causes the monitor 907 to display a user interface 9071 that allows the user to select one or more of the variable information from the plurality of variable information acquired from a snapshot.

When the user selects a checkbox designating the variable information for one or more variables from the plurality of variable information in the displayed list, the CPU 901 receives that selection. The CPU 901 extracts the designated variable information from the file in which the plurality of variable information is stored.

When the CPU 901 (simulation execution module 863) receives an instruction from the user to perform a re-simulation using a modified control program, the CPU 901 uses the extracted variable information to execute the simulation of the modified control program.

Accordingly, by using the user interface 9071 it is even easier for the user to set the input variables used in the re-simulation.

The embodiment disclosed here is merely an example, and is not limited to the above particulars. The scope of the present invention is represented by the scope of the claims, and is intended to include all equivalents and modifications allowable by the scope of the claims.

REFERENCE NUMERALS

1 Control system
2 Server
4 Network
8 Controller support program
10, 15 Control program
12 CD-ROM
14 Controller
16 Controlled device
17 Motor driver
18 Motor
201, 201A, 202, 202A File
802 User interface module
804 Display data generator module
806 Simulation module
808 Control program storage module
810 Control program editor module
812 Controller interface module
861 Communication processor
863 Simulation execution module
902 ROM
903 RAM
907 Monitor
9071 User interface
909 Communication interface

The invention claimed is:

1. An information processing device for simulating a control program executed in a controller that controls operations of a machine during a control cycle, the information processing device comprising:
  a memory, wherein the control program is stored in the memory;
  a monitor;
  a processor coupled to the memory and the monitor, the processor configured with a program to perform operations as:
    a simulation execution module for performing a first simulation based on the control program stored in the memory;
    an acquisition module for acquiring values for a plurality of variables and acquiring identification information identifying each of the plurality of variables at an arbitrary time during the first simulation based on the control program, the value of at least one of the plurality of variables being an input to the control program during the first simulation performed based on the control program;
    a display control module for causing a display device to display a result of the first simulation including the acquired values of the plurality of variables; and
    a modification module for modifying the control program stored in the memory to produce a modified control program based on the result of the first simulation including the acquired values of the plurality of variables; wherein the processor is configured with the program to perform operations such that:
    the simulation execution module performs a second simulation based on: the modified control program; and a designation of a designated variable from among the plurality of variables acquired at the arbitrary time during the first simulation, the second simulation using at least one of the acquired values for the designated variable to facilitate setting variables for the modified control program by restoring the value of the designated variable for execution of the second simulation such that the acquired values of the plurality of variables not included in the designation are not included in the performance of the second simulation by the simulation execution module; and the display control module causes the monitor to display a result of the second simulation based on the modified control program.

2. The information processing device according to claim 1, wherein the plurality of variables comprises modifiable variables input to the simulation execution module and non-modifiable variables output from the simulation execution module; and of the modifiable variables and the non-modifiable variables, the processor is configured with the program to perform operations such that operation as the simulation execution module comprises using only the modifiable variables to simulate the modified control program.

3. The information processing device according to claim 1 wherein the arbitrary time comprises a time at a start or immediately after the start of simulating the control program.

4. The information processing device according to claim 1, wherein:

the processor is configured with the program to perform operations further comprising operation as a reception module and operation as an extraction module;

the identification information for each variable comprises a name of each variable; and the processor is configured with the program to perform operations such that:

operation as the display control module comprises operation as the display control module that causes the display device to display a list of names of each of the acquired variables;

operation as the reception module comprises operation as the reception module that accepts the designation of the designated variable from the plurality of variables displayed in the list;

operation as the extraction module comprises operation as the extraction module that extracts the value of the variable for the designated variable from among the values of the plurality of variables; and operation as the simulation execution module comprises operation as the simulation execution module that uses the values of the extracted variables to simulate the modified control program.

5. A simulation method on an information processing device for simulating a control program executed in a controller that controls operations of a machine during a control cycle, the simulation method with steps comprising:

simulating the control program in a first simulation;

acquiring values for a plurality of variables and acquiring identification information identifying each of the plurality of variables at an arbitrary time during the first simulation based on the control program, the value of at least one of the plurality of variables being an input to the control program during the first simulation based on the control program;

displaying a result of the first simulation including the acquired value of the plurality of variables;

modifying the control program based on the result of the first simulation including the acquired value of the plurality of variables to produce a modified control program;

simulating the modified control program in a second simulation based on: the modified control program; and a designation of a designated variable from among the plurality of variables acquired at the arbitrary time during the first simulation, the second simulation using at least one of the acquired values the designated variable to facilitate setting variables for the modified control program by restoring the value of the designated variable for execution of the second simulation such that the acquired values of the plurality of variables not included in the designation are not included in the simulation of the modified control program in the second simulation; and displaying a result of the second simulation based on the modified control program.

6. A non-transitory computer readable medium storing a program for controlling an information processing device that simulates a control program executed in a controller controlling operations of a machine during a control cycle, the program when read and executed by a processor causing the processor to perform operations comprising:

simulating the control program in a first simulation;

acquiring values for a plurality of variables and acquiring identification information identifying each of the plurality of variables at an arbitrary time during the first simulation based on the control program, the value of at least one of the plurality of variables being an input to the control program during the first simulation based on the control program;

causing a result of the first simulation including the acquired values of the plurality of variables to be displayed on a monitor;

modifying the control program based on the result of the first simulation including the acquired values of the plurality of variables to produce a modified control program;

simulating the modified control program in a second simulation based on: the modified control program; and a designation of a designated variable from among the plurality of variables acquired at the arbitrary time during the first simulation, the second simulation using at least one of the acquired values the designated variable to facilitate setting variables for the modified control program by restoring the value of the designated variable for execution of the second simulation such that the acquired values of the plurality of variables not included in the designation are not included in the simulation of the modified control program in the second simulation; and causing a result of the second simulation based on the modified control program to be displayed on the monitor.

* * * * *